Patented Aug. 3, 1943

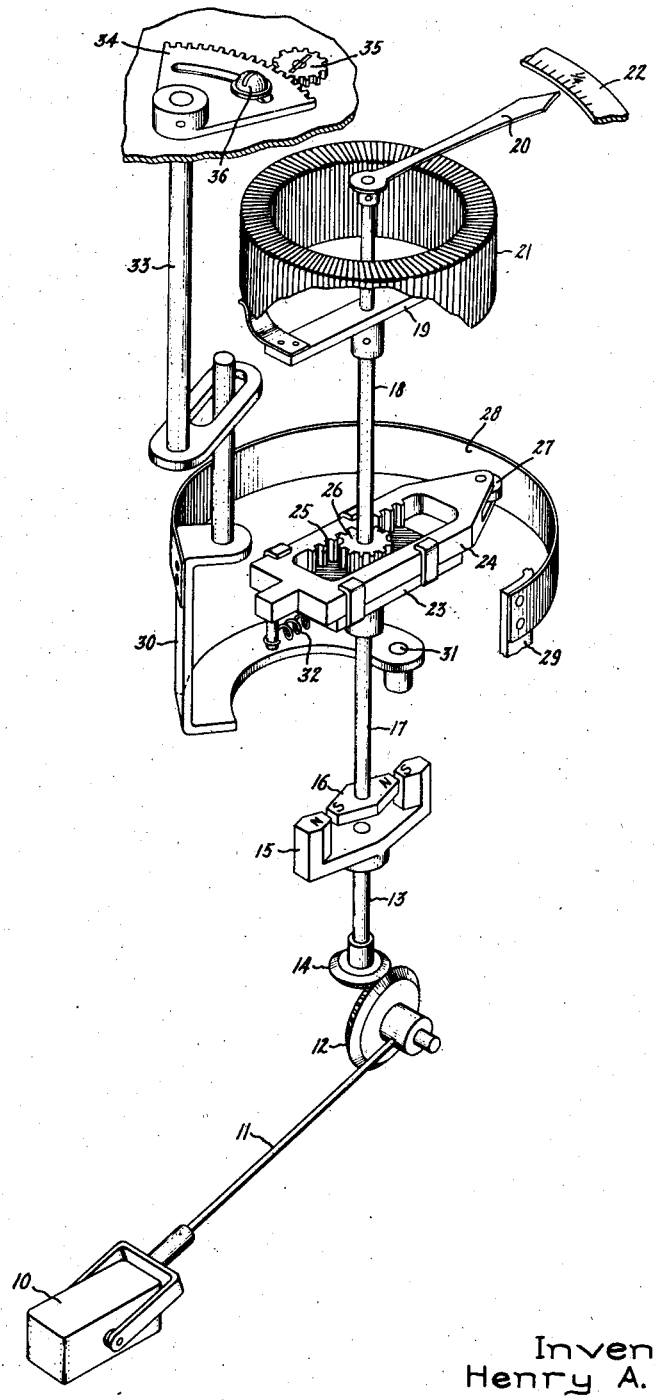

2,325,582

UNITED STATES PATENT OFFICE 2,325,582

INSTRUMENT DEFLECTION MODIFIER

Henry A. Andersen, Swampscott, Mass., assignor to General Electric Company, a corporation of New York Application July 11, 1941, Serial No. 401,979

5 Claims. (Cl. 73—317)

My invention relates to a mechanical rotary motion modifier of a character useful in connection with measuring instruments of the deflection type for obtaining a desirable expansion or contraction of rotary measurement movement between the measuring instrument and its scale or the like.

The single figure of the drawing illustrates the invention as used in connection with a liquid level gauge and transmitter indicator and it may be used here for the purpose of adapting a standard gauge device for the measurement of liquid level in tanks of different depths.

The features of the invention which are believed to be new and patentable will be pointed out in the claims appended hereto.

In the drawing, 10 represents a float for gauging the depth of liquid in a tank such for example as an aeroplane gasoline tank. The float is connected with a crank arm 11 for turning a bevel gear wheel 12 about a horizontal pivot as the float rises and falls. The rotary movement of gear 12 is amplified and caused to rotate a vertical shaft 13 through a second bevel gear 14 in mesh with gear 12. A flexible magnetic coupling comprising magnetic parts 15 and 16 one or both of which are permanent magnets may be used to couple the shaft 13 with a measuring shaft 17. This is desirable to reduce the oscillations of shaft 17 which may be due to surging of the liquid in the tank being metered. Coaxial with but mechanically separated from shaft 17 is a deflection shaft 18 which carries brush rigging 19 and a pointer 20. The brush rigging cooperates with a stationary current regulator 21 such as may be used for the purpose of electrically transmitting the rotary movement of shaft 18 to a distant dial. Pointer 20 cooperates with a scale 22 for directly indicating the rotary position of shaft 18 in terms of liquid level.

Between the shafts 17 and 18 is inserted my rotary motion modifying device and is used to obtain a uniform expansion or contraction of the angular motion of one shaft with respect to the other. For example, let us assume that the scale 22 and the transmitter 19—21 are designed for a rotary movement of 180 degrees between an empty and full condition of the gasoline tank with which the device may be used. Also, that it is desirable to use the same indicating equipment with tanks of different depths such that in one tank the float 10 will fall 15 inches, in another tank the float will fall 12 inches and in another tank it will fall 18 inches between full and empty tank conditions. If the rotary movement of shaft 17 is 180 degrees corresponding to the length of scale 22 or desired movement of the transmitter between a full and empty condition of the 15 inch tank, no expansion or contraction of the relative motions of shafts 17 and 18 is required. However for the 12 inch tank it will be desirable to increase the rotary motion of shaft 18 with respect to shaft 17 and for the 18 inch tank it will be desirable to decrease the rotary motion of shaft 18 with respect to shaft 17, in order that the same indicating equipment may be used without recalibration for any one of the three tank depths. I have provided an adjustable rotary motion modifying device between the two shafts 17 and 18 to meet the requirements given by way of example.

Secured to the upper end of shaft 17 is a guide member 23 in which a slide 24 may move in a horizontal direction. Both of these parts are rotated with shaft 17 but part 24 may also slide in a radial direction determined by the angular position of guide 23 and shaft 17 at any instant. Slide 24 has an internal rack 25 meshing with a gear 26 secured to deflection shaft 18. Hence it will be evident that rotary movement of shaft 17 will be directly conveyed to shaft 18 without modification, if slide 24 does not move radially. One end of guide 24 carries a roller 27 which rolls on the inner surface of a curved guide 28 made of a rather stiff resilient strip fastened at one end to a stationary support at 29 and having its other end fastened to a support 30 which is adjustable about a pivot at 31 off center with respect to shafts 17 and 18. The arrangement is such that by adjustment of part 30 about pivot 31 the guide member 28 may be positioned in the arm of a circle about the axis of shaft 18 or as a spiral with the up-scale end at 30 at either a smaller or greater radius than the end at 29 and extending over the arc of travel of the roller end of slide 24. The slide 24 is biased by a spring 32 secured between parts 23 and 24 so that the roller 27 contacts at all times against the curved inner surface of guide member 28. Hence as shaft 17 and parts 23 and 24 are rotated up-scale or counterclockwise as pictured, the slide 24 may rotate in a fixed radial position or it may move inwardly or outwardly depending upon whether the guide 28 is in the arc of a circle or is adjusted to expand or contract the resulting rotary movement of shaft 18. The part 28 may be considered as a stationary cam having an adjustable cam surface, and the part 24 as a rotary cam follower.

To expand the rotary movement the support 30 is moved counterclockwise to decrease the radius at the up-scale movable end of the cam surface. In such case the up-scale rotary movement of shaft 18 due to its connection with shaft 17 is increased by the inward radial movement of guide 24. The reverse action occurs for a down-scale movement. If it is desired to contract the up-scale deflection characteristics the support 30 is moved clockwise to increase the radius at its up-scale end and in this case the rotary movement imparted to shaft 18 by outward movement of slide rack 24 when an up-scale operation occurs is subtracted from the rotary movement of shaft 18 due to bodily rotation of the connected parts between shafts 17 and 18.

The strip 28 is made sufficiently stiff that its shape will not be changed by pressure of roller 27 thereon and so that the resulting expansion or contraction of the deflection due to the cam action will always be similarly and, preferably, uniformly distributed through the deflection range and so that the use of the motion modifying feature will not distort the scale distribution. The curved guide strip 28 should extend slightly beyond the arc of travel of slide 24.

A crank 33 operated through gears 34 and 35 may be provided for accurate adjustment of the support 30. The gear 35 is represented as having a screw driver slot for adjustment purposes. After adjustment a holding screw 36 may be tightened to secure the crank in the desired position of adjustment.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a shaft which is rotated in response to a condition to be measured, a deflection shaft in axial alignment with the first shaft, an indicator actuated thereby, and means interconnecting said shafts for transmitting rotary motion and varying the drive ratio between them, comprising a member rotated by the first shaft which is movable radially of said shafts, a driving connection between said radially movable member and deflection shaft for rotating the latter both in response to radial and rotary movements of said member and adjustable means for determining the extent and direction of radial movement of said member when said member is rotated in a given direction.

2. A variable ratio transmission comprising two axially aligned shafts, a member rotated by one shaft and radially movable with respect thereto, a driving connection between said member and other shaft effective to transmit rotary motion between said shafts and also to rotate the other shaft with variable transmission ratio by radial movement of said member, a stationary circular guide for said member for determining its radial movement as the one shaft is rotated, and means for varying the shape of said guide to vary the transmission ratio between said shafts.

3. In combination, axially aligned driven and driving shafts, a driving connection between said shafts comprising a member rotated by the driving shaft and radially movable with respect thereto, a gear rack on said member and a gear pinion on the driven shaft meshing with said rack, whereby the driven shaft is rotated both by radial and rotary movements of said member, a stationary guide having a curved surface facing said radially movable member, means for causing the radially movable member to bear against the curved surface of said guide member as the member is rotated, so as to determine the radial position of said member in different rotary positions, and means for changing the shape of said curved surface to vary the transmission ratio between said shafts.

4. In combination, a pair of axially aligned shafts, a variable ratio driving connection between said shafts comprising a member driven by one shaft and radially movable with respect thereto, a driving connection between said member and the other shaft effective to cause rotation of said second shaft both by rotation and radial movement of said member, a flexible guide member fixed at one end, curved about the radially movable member and adjustably secured at the other end so that the radial distance between it and the axis of rotation of said shafts may be uniformly varied between the ends of the guide, and means for causing said member to ride upon said curved guide as said member is rotated, to control the radial position of said member in different rotary positions.

5. In combination, a measuring shaft which is rotated in response to a condition to be measured through an angle of less than 360 degrees over the range of measurement, a deflection shaft in axial alignment with the measuring shaft and a driving connection between said shafts for varying the relative rotary movements of said shafts over the measurement range, said connection comprising a member rotated by the measurement shaft and radially movable with respect thereto, a driving connection between said member and deflection shaft for rotating the deflection shaft both by rotary and radial movement of said member, a guide of stiff resilient material curved about said member substantially in the arc of a circle, said guide being fixedly secured at its down-scale end and having its up-scale end adjustable for the purpose of varying its curvature both ways from a true circular arc, and a roller on said radially movable member bearing against said guide, whereby the radial movement, if any, of said member over the rotary measurement range is determined by the shape of said guide.

HENRY A. ANDERSEN.